United States Patent [19]

Huffman

[11] Patent Number: 4,692,895
[45] Date of Patent: Sep. 8, 1987

[54] MICROPROCESSOR PERIPHERAL ACCESS CONTROL CIRCUIT

[75] Inventor: Jacque S. Huffman, Morristown, N.J.

[73] Assignee: American Telephone and Telegraph Company, AT&T Bell Laboratories, Murray Hill, N.J.

[21] Appl. No.: 564,931

[22] Filed: Dec. 23, 1983

[51] Int. Cl.$^4$ ............................................. G06F 13/00
[52] U.S. Cl. .................................................... 364/900
[58] Field of Search ... 364/200 MS File, 900 MS File

[56] References Cited

U.S. PATENT DOCUMENTS

| | | | |
|---|---|---|---|
| 3,753,232 | 8/1973 | Sporer | 364/200 |
| 4,050,096 | 9/1977 | Bennett et al. | 364/200 |
| 4,050,097 | 9/1977 | Miu et al. | 364/200 |
| 4,153,941 | 5/1979 | Caddell | 364/900 |
| 4,386,401 | 5/1983 | O'Brien | 364/200 |
| 4,414,664 | 11/1983 | Greenwood | 371/20 |
| 4,438,490 | 3/1984 | Wilder, Jr. | 364/200 |

OTHER PUBLICATIONS

"Memory and I/O Synchronization—The WAIT State," *Microprocessors and Programmed Logic*, K. L. Short, 1981, pp. 95–97.

*Primary Examiner*—Gareth D. Shaw
*Assistant Examiner*—Kevin A. Kriess
*Attorney, Agent, or Firm*—Alfred G. Steinmetz

[57] ABSTRACT

A microprocessor system is adapted to permit the accessing of peripheral devices that have slow data bus release times without acquisition conflicts by placing the microprocessor in the hold state after the data acquisition. Logic circuitry responsive to the hold state supplies control signals to the peripheral devices over the bus during the hold state. At the end of one hold state, normal operation is resumed.

3 Claims, 2 Drawing Figures

MICROPROCESSOR PERIPHERAL ACCESS CONTROL CIRCUIT

TECHNICAL FIELD

This invention relates to microprocessor systems and more particularly the transfer of data between the microprocessor and its peripheral devices. It is particularly concerned with facilitating the use of peripheral devices having a slow data bus release time relative to the release time allowed by the microprocessor.

BACKGROUND OF THE INVENTION

If the data acquisition access and/or release times of a peripheral device are not faster than the release time allowed for by the microprocessor, the two devices may operate in conflict with each other during data access operations resulting in acquisition conflicts producing spurious data signals on the data bus. This release time is the time interval between the completion of a data transfer and the release of the data bus by the peripheral device. To prevent occurrences of these data acquisition conflicts within the microprocessor system, peripheral device selection is normally limited to devices having substantially faster access and release times than the microprocessor. Frequently, however it is desirable to use a microprocessor with a slow peripheral device such as a memory or I/O device having longer access and/or release times than directly compatable with the microprocessor, since these slower peripheral devices are normally cheaper than fast ones.

In order to avoid data acquisition access conflicts caused by the longer access time of the slower peripheral device, the WAIT state facility of the microprocessor is frequently used. When the microprocessor addresses the slow memory or I/O device, external logic circuitry responds to the particular address and applies a signal to the microprocessor to add a WAIT state to the data acquisition cycle.

The WAIT state of a microprocessor is a period of time in which the normal processing of clock cycles is inhibited in response to a signal input to the microprocessor. Entry into the WAIT state extends the duration of time available for data access and synchronization with the slow peripheral device. While utilization of the WAIT state increases the allowable access time for slow peripheral devices, it does not increase the allowable release time for the slow peripheral device.

SUMMARY OF THE INVENTION

To avoid the above described acquisition release conflict, a microprocessor is synchronously placed in a hold state after a slow peripheral device is accessed to disconnect it from the bus and create a dead time thereon in response to feedback of the output of an address decoding chip select device, identifying the slow device, and which output is also applied to the hold request pin of the microprocessor. Logic circuitry responsive to the hold acknowledge output is utilized to supply the IO/$\overline{M}$ signals to the memory chips while the microprocessor is in its hold state. Since the microprocessor is in effect disconnected from the data and address bus during the hold state, a slow release of the data bus by the peripheral device causes no spurious data acquisition. After one hold cycle, the microprocessor exits the hold state and resumes its normal operation.

Utilization of the hold state during data acquisition of slow peripheral devices advantageously permits the microprocessor to continue instruction processing internally while disconnected from the bus.

DETAILED DESCRIPTION

Figure 1:
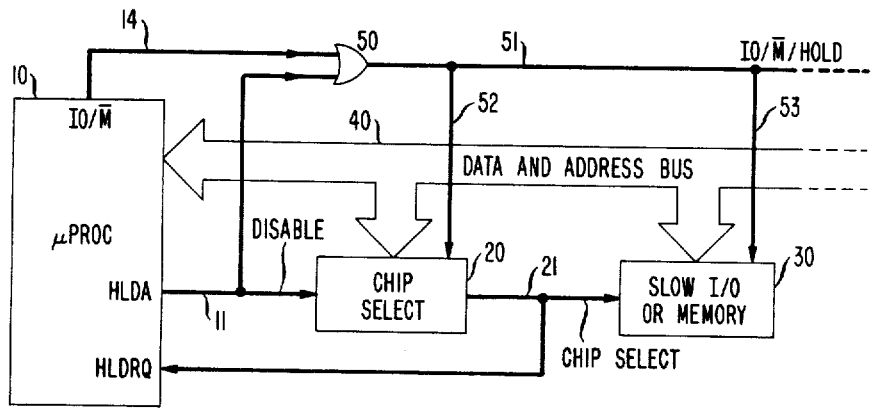
FIG. 1 is a block schematic of a portion of a microprocessor system coupled to address a slow peripheral device.

A portion of a microprocessor system is shown in FIG. 1 and includes the microprocessor 10, a chip selection circuit or address decoder 20 and a slow peripheral device 30 which may comprise an input/output device on a memory device.

The microprocessor 10 internally comprises a plurality of registers, arithmetic and logic units in a single monolithic chip embodiment. Communications to outside memory, input/output and other peripheral device is through a fixed number of pins connected to an external data and address bus 40. These pins are dedicated to this particular function which includes transmission and receipt of addressing and data signals through the pins coupled to bus 40. Other pins of microprocessor 10 are adapted to receive control signals applied directly to the microprocessor and to transmit responses thereto.

Hold request and hold acknowledge pins of microprocessor 10 are connected to leads 12 and 11. These two particular pins are functional pins found on many microprocessors such as for example the ITEL 8085A which is suitable for use in the illustrative embodiment disclosed herein. A signal input to the hold request pin effectively disconnects the microprocessor from the data and address bus and floats many of the control lines connected to the $\overline{RD}$, $\overline{WR}$ and IO/$\overline{M}$ control pins for example. When a hold request is received by the microprocessor 10 from lead 12, it initiates action therein which synchronously relinquishes use of or disconnects the bus at the end of the current instruction cycle. At this time the microprocessor 10 provides an acknowledgement on lead 11 from the hold acknowledge pin. During the hold state internal data processing within the microprocessor may continue. The microprocessor is reconnected to the bus only after the hold signal is removed and in synchronism with its operative machine cycles. During the hold period, the hold acknowledge pin supplies an output signal via lead 11 to indicate that the microprocessor is currently in the hold state.

As shown in FIG. 1, the hold request pin connected to lead 12 is energized by an output of the chip select device 20 when it addresses a slow peripheral device 30. The chip select 20 is an address decoder circuit well known to those skilled in the art which responds to specific addresses to enable a chip select input of the peripheral device addressed. As shown in FIG. 1, an output lead 21 is coupled to a particular addressed peripheral device 30. The output on lead 21 is fedback, via lead 12, to the hold request pin of the microprocessor 10.

Data and addressing output of the microprocessor is transmitted, via bus 40, which is shown connected to the chip select 20 and to the slow peripheral device 30 which may be a I/O device or a memory unit. The chip select device responds to specific address information to supply enabling signals as indicative above to the chip select control of the peripheral device having the desired address. Since the data transforming operations of a microprocessor system is well known to those skilled in the art, it need not be disclosed herein in detail.

The hold acknowledge output of the microprocessor 10 on leads 11 and 13, and the IO/$\overline{\text{M}}$ output on lead 14, which is operative to describe the current machine cycle status of the microprocessor to the peripheral devices, are both connected to OR gate 50. The output of OR gate 50 on lead 51 is connected via leads 52 and 53 to the enable input of the chip select 20 and to the IO/$\overline{\text{M}}$ or enable input of the peripheral device 30.

In operation, whenever the microprocessor 10 addresses a slow peripheral device 30, the output of the chip select device 20 directed to a chip select input of that device 30 is also fed back, via lead 12, to the hold request pin of the microprocessor 10.

Upon completion of the data transfer with the slow peripheral device 30 (i.e., that is the data has been fully accessed), the microprocessor 10 enters a hold state and disconnects itself from the data and address bus 40 in response to the hold request input and issues a hold acknowledge signal via leads 11 and 13 to the chip select device 20 and the OR gate 50, respectively. The output of the hold acknowledge signal on lead 11 disables the chip select device 20 which in turn disables peripheral device 30 via lead 21 and removes the hold request signal from the microprocessor 10 via lead 12. After completion of the current hold cycle by the microprocessor 10, standard addressing and data transfer is resumed.

The output of OR gate 50 is coupled to the enable input of devices 20 and 30 and in effect utilizes the hold acknowledge signal to extend the duration of the IO/$\overline{\text{M}}$ status signal during the hold cycle. The signal on lead 51 disables all peripheral devices of the opposite type as device 30 (i.e., IO or memory) during the hold cycle. The chip select device 20 is disabled during the hold cycle via lead 11 and it disables all peripheral devices of the same type as device 30.

Figure 2:
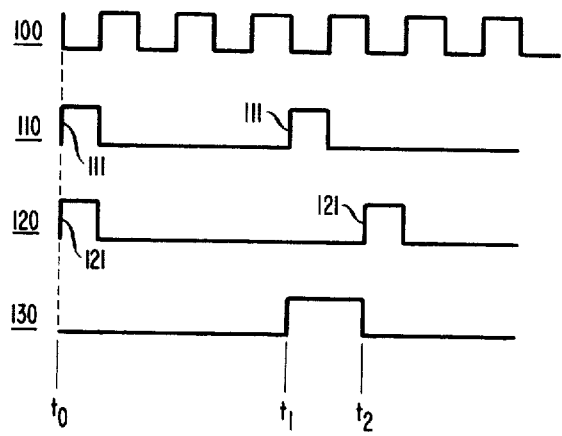
FIG. 2 is a timing diagram showing the utilization of a hold state to permit a slow peripheral device to be accessed.

The operative effects of the arrangement may be readily ascertained by examination of the timing diagram of FIG. 2. Waveform 100 represents the machine cycles of the microprocessor 10. Various input/output and data transferal operations take a fixed number of machine cycles. A typical instruction process may take three machine cycles from one instruction to the next instruction as is shown by the 3 cycle separation between instructions 111 in waveform 110. After the period $t_0$ to $t_1$, the effect of the hold request feedback signal is to extend the period between successive instructions 121 as shown by waveform 120, wherein a hold period exemplified by waveform 130 is shown extending the data bus release period goes from $t_1$ to $t_2$ in order to provide time for a slow peripheral device to release the bus without a spurious data signal being accepted by the microprocessor 10.

What is claimed is:

1. A microcomputer system comprising:
   a microprocessor,
   a peripheral data handling device including a chip select input and an IO/$\overline{\text{M}}$ input,
   a data and address bus interconnecting the microprocessor and the peripheral data handling device
   a chip select device coupled to the data and address bus and responsive to selected addresses to enable a chip select input of an addressed device, the peripheral data handling device being one of the devices connected to be enabled by the chip select by having its chip select input enabled,
   the microprocessor having a fixed time interval allowance between completion of a data transfer and release of the data bus by the peripheral data handling device during which it is quiescent and the peripheral data handling device having a release time between completion of a data transfer and release of the bus greater than the fixed time interval allowance,
   the microprocessor having a hold state which it enters in response to a hold request input signal, the hold state being operative to disconnect the microprocessor from the data and address bus and additionally operative for generating a hold acknowledge signal,
   feedback means from the chip select device to apply a hold request input signal to the microprocessor when the peripheral data handling device is being addressed,
   the chip select device being coupled to receive and responsive to the hold acknowledge signal applied to remove the hold request input signal to the microprocessor, and
   means for supplying a control signal which is applied to the IO/$\overline{\text{M}}$ input of the peripheral data handling device during the hold state including means to gate the hold acknowledge signal to the peripheral data handling device as the control signal.

2. A microcomputer system as defined in claim 1 wherein the means for supplying a control signal comprises a hold acknowledge signal output lead of the microprocessor and the gating means comprises an OR gate having a first input connected to the hold acknowledge signal output lead and an second input connected to an IO/$\overline{\text{M}}$ signal output lead of the microprocessor and an output of the OR gate is connected to the peripheral data handling device.

3. A microcomputer system as defined in claim 2 wherein an access control signal supplied by the microprocessor is gated through the OR gate to the peripheral data handling device.

* * * * *